UNITED STATES PATENT OFFICE.

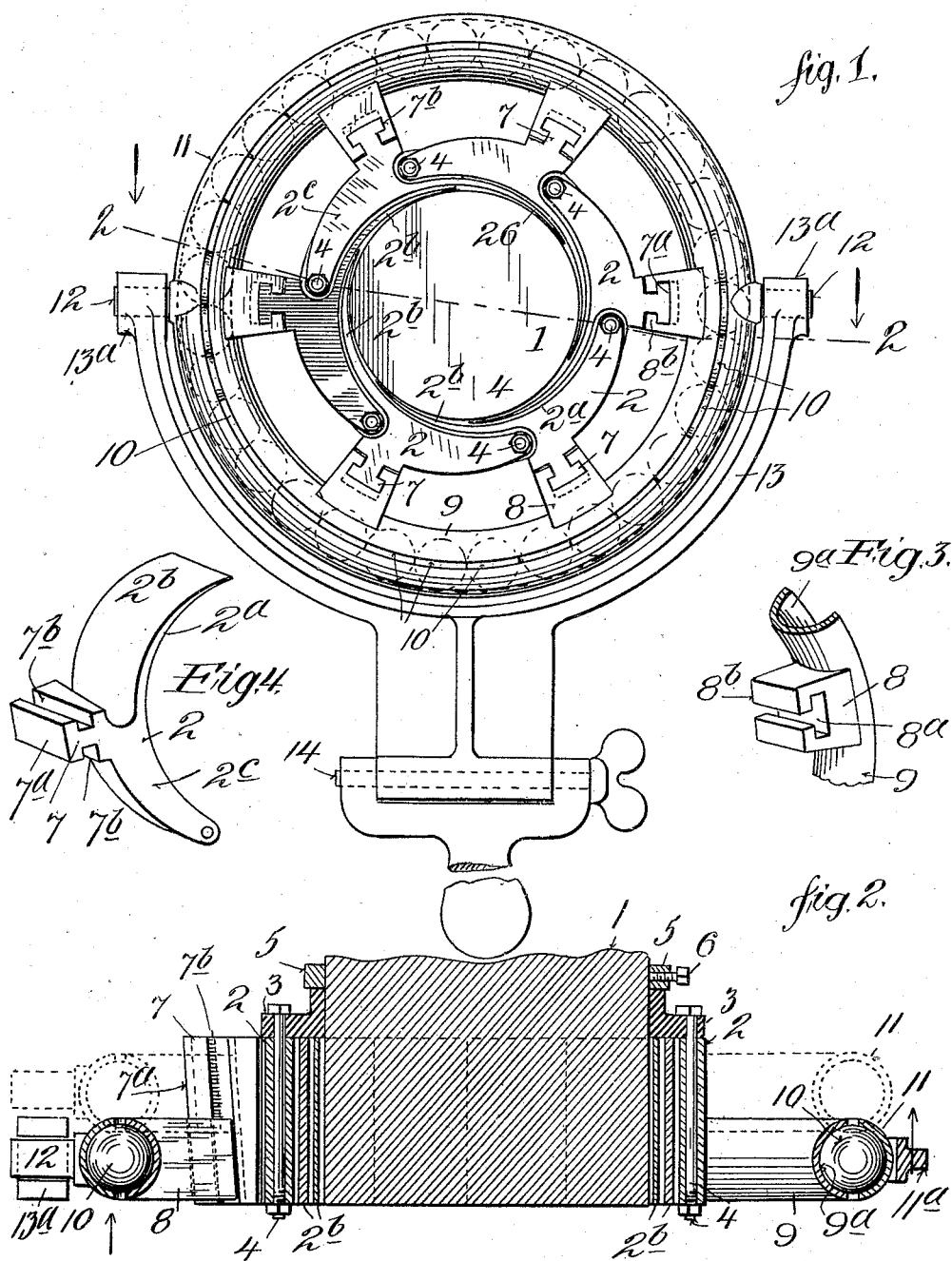

ARTHUR F. JACKSON, OF NEW YORK, N. Y.

CLUTCH MECHANISM.

No. 923,180.  Specification of Letters Patent.  Patented June 1, 1909.

Application filed July 8, 1908. Serial No. 442,441.

*To all whom it may concern:*

Be it known that I, ARTHUR F. JACKSON, a citizen of the United States, and resident of New York city, borough of Brooklyn, in the county of Kings and State of New York, have invented certain new and useful Improvements in Clutch Mechanism, of which the following is a specification.

The object of my invention is to provide improved means for clutching or gripping a circular body such as a shaft, disk, hollow can, or the like, to the end that a substantially equal pressure may be exerted upon the periphery of such body all around the same.

In carrying out my invention I provide a plurality of levers that are pivotally supported and have curved inner surfaces to fit around or encircle a body, each lever having a projecting relatively thin and preferably tapering spring-like finger, all so arranged that the finger of one lever lies under the next adjacent lever on one side of it, and lies over the finger on the other side of it, with means for causing inward movement or pressure of said levers, whereby one lever when moved inwardly not only causes its finger to press against the circular body, but also causes the adjacent or underlying finger or fingers also to press against said body for gripping the latter.

My invention also comprises novel details of improvement and combinations of parts that will be more fully hereinafter set forth and then pointed out in the claims.

Reference is to be had to the accompanying drawings forming part hereof, wherein, Figure 1 is a face view of a clutch mechanism embodying my invention, Fig. 2 is a cross section, enlarged, substantially on the plane of the line 2, 2, in Fig. 1, looking in the direction of the arrows, Fig. 3 is a detail perspective view of part of the lever actuating ring, and Fig. 4 is a perspective view of one of the levers.

Similar numerals of reference indicate corresponding parts in the several views.

In the accompanying drawings the numeral 1 indicates a circular body, which as illustrated is in the nature of a shaft, although the same may be a disk or hollow body, such as a can, the periphery of which it is intended to grip or clamp. Surrounding body 1 are levers 2, whose inner faces $2^a$ are suitably curved and said levers are pivotally supported by any suitable means to enable them to act upon body 1. I have shown a disk or support 3 surrounding body 1 and supporting pins 4 upon which levers 2 are pivoted, and at 5 is a thrust ring suitably fixed upon body 1 as by a screw 6 and located adjacent disk 3 to limit the movement of said disk along body 1. Levers 2 have projecting tapering fingers or extensions $2^b$ which overlap one another, the arrangement shown being such that the finger $2^b$ of one lever lies under the main part $2^c$ of the lever next adjacent on one side and lies over the finger $2^b$ of the lever next adjacent on the other side, the relative arrangement of parts being such that when the levers are pressed inwardly their fingers $2^b$ will not only thereby be pushed against body 1 by the corresponding overlying lever, but each finger will also press the finger $2^b$ within it against body 1. Said fingers are so shaped and tapered as to properly follow and bear upon the periphery of body 1 to make proper frictional contact therewith, and each finger is strengthened in action by reason of the bearing of the adjacent lever upon such finger.

Any suitable means may be provided for pressing the levers inwardly toward body 1. I have shown each lever provided with a block or bearing piece 7 the operating portion of which is inclined with respect to the longitudinal axis of body 1. For this purpose I have shown the outer surface $7^a$ of block or bearing 7 as outwardly inclined, and correspondingly inclined grooves $7^b$ are shown provided on opposite sides of block 7 receiving the inward projections $8^b$ of block 8 whose channels or grooves $8^a$ receive the parts $7^a$ of the levers and are correspondingly inclined, the blocks 8 being adapted to slide upon the blocks 7. Blocks 8 are secured on the inner surface of a ring 9 having a groove or raceway $9^a$ receiving the anti-friction balls 10. At 11 is an external ring having an inner groove or raceway $11^a$ receiving the balls 10. The arrangement is such that ring 9 may revolve freely with respect to ring 11 and yet when the latter is moved laterally ring 9 and blocks 8 will be moved with respect to blocks 7 to thereby cause the latter to push the levers 2 toward body 1 or away from the latter. While any suitable means may be provided for adjusting ring 11 laterally I have shown the latter provided on diametrically opposite sides with studs or pins 12 receiving the forked ends $13^a$ of a yoke-lever 13 which may be pivotally supported in any suitable manner, as at 14, whereby as said lever is rocked the ring 11 will be moved laterally in either direction to carry ring 9 and blocks 8 with it.

With the body 1 fitted between the levers as illustrated in Fig. 1 and the rings 9 and 11 in substantially the position shown in Fig. 2, the body 1 or levers 2 may have relative rotary motion with respect to each other. When ring 11 is moved in the direction of the arrows in Fig. 2, its blocks sliding along the blocks 7 of levers 2 will, by reason of the inclined portions 7$^a$ of blocks 7, cause the latter and levers 2 to be pressed inwardly as desired, and thereupon the fingers 2$^b$ will grip body 1 and exert frictional contact therewith, each of the levers acting upon the corresponding finger 2$^b$ in the manner before described. If body 1 rotates it will carry the levers and their support or disk around with it in accordance with the frictional contact of the levers therewith, or if the levers be caused to rotate they will carry body 1 around correspondingly. If body 1 is merely to be gripped for holding it firmly so as to strengthen it temporarily, such as a tin can where the same is to be filled with material, it will be merely necessary to fit the clutching mechanism over the can and then move ring 11 in the proper direction to cause the levers to grip the body. The levers will be released from the body readily and quickly by merely moving the ring 11 outwardly whereby blocks 8 will slide along blocks 7. The projections 8$^b$ working in the grooves 7$^b$ not only serve to shift the levers inwardly and outwardly but aid in sustaining said levers when they are released from body 1.

Various changes may be made in the details of construction and relative arrangements of parts set forth, within the scope of the appended claims, without departing from the spirit of my invention.

Having now described my invention what I claim is:

1. A clutch mechanism comprising a plurality of circularly disposed levers provided with spring-like fingers, the finger of one lever lying opposite the main part of an adjacent lever and to be operated thereby, and means for moving said levers inwardly.

2. A clutch mechanism comprising a plurality of circularly disposed levers provided with fingers, the finger of one lever lying opposite the main part of the lever at one side of said first named lever, and said finger lying over the finger of the lever at the other side of said first named lever to cause said first named lever to operate on both fingers, and means for moving said levers inwardly.

3. A clutch mechanism comprising a plurality of levers having spring-like fingers, a finger of one lever lying under the next adjacent lever to be engaged and operated thereby, a support to which said levers are pivotally connected, and means to operate said levers.

4. The combination of a plurality of circularly disposed levers having curved faces and provided with spring-like fingers which overlap one another respectively, and means connected with said levers and movable with respect thereto for operating said levers.

5. A clutch mechanism comprising a plurality of circularly disposed levers having inclined blocks, a ring surrounding said levers and having operating surfaces to co-act with the first named blocks, and means for moving said ring laterally.

6. A clutch mechanism comprising a plurality of circularly disposed levers having inclined blocks, a ring surrounding said levers and having corresponding blocks to co-act with the first named blocks, and means for moving said ring laterally.

7. A clutch mechanism comprising a plurality of circularly disposed levers having inclined blocks provided with grooves, a ring surrounding said levers and having blocks provided with projections entering said grooves and arranged to co-act with the inclined blocks, and means for moving said ring laterally.

8. A clutch mechanism comprising a plurality of circularly disposed levers, a ring surrounding said levers, means interposed between said ring and levers for actuating the latter by the ring, an outer ring independent of the first named ring, antifriction balls between said rings, and means for operating the second named ring.

9. A clutch mechanism comprising a plurality of levers having fingers, a finger of one lever lying under the next adjacent lever, means to support said levers, a ring surrounding said levers, means interposed between said ring and levers for operating the latter by the ring, and means for moving said ring laterally.

10. A clutch mechanism comprising a plurality of levers having fingers, a finger of one lever lying under the next adjacent lever, means to support said levers, a ring surrounding said levers, means interposed between said ring and levers for operating the latter by the ring, an outer ring, anti-friction balls interposed between said rings, and means for operating the outer ring.

Signed at New York city, in the county of New York, and State of New York, this 29th day of June, A. D. 1908.

ARTHUR F. JACKSON.

Witnesses:
T. F. BOURNE,
MARIE F. WAINRIGHT.